US011676594B2

(12) United States Patent
Sharifi et al.

(10) Patent No.: US 11,676,594 B2
(45) Date of Patent: Jun. 13, 2023

(54) DECAYING AUTOMATED SPEECH RECOGNITION PROCESSING RESULTS

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

(*) Notice: Subject to any disclaimer, the term of this patent is extended or adjusted under 35 U.S.C. 154(b) by 224 days.

(21) Appl. No.: 17/111,467

(22) Filed: Dec. 3, 2020

(65) Prior Publication Data

US 2022/0180866 A1 Jun. 9, 2022

(51) Int. Cl.
*G10L 15/22* (2006.01)
*G10L 25/78* (2013.01)

(52) U.S. Cl.
CPC ............ *G10L 15/22* (2013.01); *G10L 25/78* (2013.01)

(58) Field of Classification Search
CPC ... G10L 15/22; G10L 15/30; G10L 2015/223; G10L 15/32
See application file for complete search history.

(56) References Cited

U.S. PATENT DOCUMENTS

| 8,463,610 B1* | 6/2013 | Bourke | G10L 15/197 |
| | | | 704/235 |
| 11,087,750 B2* | 8/2021 | Ganong, III | G06F 3/167 |
| 2015/0025890 A1* | 1/2015 | Jagatheesan | G10L 15/30 |
| | | | 704/255 |
| 2018/0025731 A1* | 1/2018 | Lovitt | G10L 15/22 |
| | | | 704/255 |
| 2018/0025732 A1* | 1/2018 | Lepauloux | G10L 25/81 |
| | | | 704/210 |
| 2019/0043503 A1* | 2/2019 | Bauer | G10L 15/02 |
| 2019/0325862 A1* | 10/2019 | Shankar | G10L 15/05 |
| 2020/0175961 A1* | 6/2020 | Thomson | G10L 15/28 |
| 2020/0243094 A1* | 7/2020 | Thomson | H04M 3/42382 |
| 2020/0365148 A1* | 11/2020 | Ji | G10L 15/22 |
| 2020/0410991 A1* | 12/2020 | Jost | G10L 15/22 |
| 2022/0157318 A1* | 5/2022 | Sharifi | G10L 15/005 |
| 2022/0269762 A1* | 8/2022 | Zhao | G06F 3/167 |

* cited by examiner

*Primary Examiner* — Mark Villena
(74) *Attorney, Agent, or Firm* — Honigman LLP; Brett A. Krueger; Grant Griffith

(57) ABSTRACT

A method for decaying speech processing includes receiving, at a voice-enabled device, an indication of a microphone trigger event indicating a possible interaction with the device through speech where the device has a microphone that, when open, is configured to capture speech for speech recognition. In response to receiving the indication of the microphone trigger event, the method also includes instructing the microphone to open or remain open for a duration window to capture an audio stream in an environment of the device and providing the audio stream captured by the open microphone to a speech recognition system. During the duration window, the method further includes decaying a level of the speech recognition processing based on a function of the duration window and instructing the speech recognition system to use the decayed level of speech recognition processing over the audio stream captured by the open microphone.

28 Claims, 6 Drawing Sheets

DECAYING AUTOMATED SPEECH RECOGNITION PROCESSING RESULTS

TECHNICAL FIELD

This disclosure relates to decaying automated speech recognition results.

BACKGROUND

Users frequently interact with voice-enabled devices, such as smart phones, smart watches, and smart speakers, through digital assistant interfaces. These digital assistant interfaces enable users to complete tasks and obtain answers to questions they have all through natural, conversational interactions.

Ideally, when conversing with a digital assistant interface, a user should be able to communicate as if the user were talking to another person, via spoken requests directed toward their voice-enabled device running the digital assistant interface. The digital assistant interface will provide these spoken requests to an automated speech recognizer to process and recognize the spoken request so that an action can be performed. In practice, however, it is challenging for a device to always be responsive to these spoken requests since it is prohibitively expensive to run speech recognition continuously on a resource constrained voice-enabled device, such as a smart phone or smart watch.

SUMMARY

One aspect of the disclosure provides a method of decaying automated speech recognition processing. The method includes receiving, at data processing hardware of a voice-enabled device, an indication of a microphone trigger event indicating a possible user interaction with the voice-enabled device through speech where the voice-enabled device has a microphone that, when open, is configured to capture speech for recognition by an automated speech recognition (ASR) system. In response to receiving the indication of the microphone trigger event, the method also includes instructing, by the data processing hardware, the microphone to open or remain open for an open microphone duration window to capture an audio stream in an environment of the voice-enabled device and providing, by the data processing hardware, the audio stream captured by the open microphone to the ASR system to perform ASR processing over the audio stream. While the ASR system is performing the ASR processing over the audio stream captured by the open microphone, the method further includes decaying, by the data processing hardware, a level of the ASR processing that the ASR system performs over the audio stream based on a function of the open microphone duration window and instructing, by the data processing hardware, the ASR system to use the decayed level of the ASR processing over the audio stream captured by the open microphone.

In some examples, while the ASR system is performing the ASR processing over the audio stream captured by the open microphone, the method also includes determining, by the data processing hardware, whether voice activity is detected in the audio stream captured by the open microphone. In these examples, decaying the level of the ASR processing the ASR system performs over the audio stream is further based on the determination of whether any voice activity is detected in the audio stream. In some implementations, the method further includes obtaining, by the data processing hardware, a current context when the indication of the microphone trigger event is received. In these implementations, instructing the ASR system to use the decayed level of the ASR processing includes instructing the ASR system to bias speech recognition results based on the current context. In some configurations, after instructing the ASR system to use the decayed level of the ASR processing over the audio stream, the method additionally includes receiving, at the data processing hardware, an indication that a confidence for a speech recognition result for a voice query output by the ASR system fails to satisfy a confidence threshold and instructing, by the data processing hardware, the ASR system to increase the level of ASR processing from the decayed level and reprocess the voice query using the increased level ASR processing. In some implementations, while the ASR system is performing the ASR processing over the audio stream captured by the open microphone, determining, by the data processing hardware, when the decayed level of the ASR processing the ASR performs over the audio stream based on the function of the open microphone duration is equal to zero and when the decayed level of the ASR processing is equal to zero, instructing, by the data processing hardware, the microphone to close. Optionally, the method may also include displaying, by the data processing hardware, in a graphical user interface of the voice-enabled device where a graphical indicator indicates the decayed level of ASR processing performed by the ASR system on the audio stream.

Another aspect of the disclosure provides a system for decaying automated speech recognition processing. The system includes data processing hardware and memory hardware in communication with the data processing hardware. The memory hardware stores instructions that when executed on the data processing hardware cause the data processing hardware to perform operations. The operations include receiving, at a voice-enabled device, an indication of a microphone trigger event indicating a possible user interaction with the voice-enabled device through speech where the voice-enabled device has a microphone that, when open, is configured to capture speech for recognition by an automated speech recognition (ASR) system. In response to receiving the indication of the microphone trigger event, the operations also include instructing the microphone to open or remain open for an open microphone duration window to capture an audio stream in an environment of the voice-enabled device and providing the audio stream captured by the open microphone to the ASR system to perform ASR processing over the audio stream. While the ASR system is performing the ASR processing over the audio stream captured by the open microphone, the operations further include decaying a level of the ASR processing that the ASR system performs over the audio stream based on a function of the open microphone duration window and instructing the ASR system to use the decayed level of the ASR processing over the audio stream captured by the open microphone.

This aspect may include one or more of the following optional features. In some examples, while the ASR system is performing the ASR processing over the audio stream captured by the open microphone, the operations also include determining whether voice activity is detected in the audio stream captured by the open microphone. In these examples, decaying the level of the ASR processing the ASR system performs over the audio stream is further based on the determination of whether any voice activity levels are detected in the audio stream. In some implementations, the operations further include obtaining a current context when the indication of the microphone trigger event is received. In these implementations, instructing the ASR system to use the decayed level of the ASR processing includes instructing the ASR system to bias speech recognition results based on the current context. In some configurations, after instructing the ASR system to use the decayed level of the ASR processing over the audio stream, the operations additionally include receiving an indication that a confidence for a speech recognition result for a voice query output by the ASR system fails to satisfy a confidence threshold and instructing the ASR system to increase the level of ASR processing from the decayed level and reprocess the voice query using the increased level ASR processing. In some implementations, while the ASR system is performing the ASR processing over the audio stream captured by the open microphone, the operations also include determining when the decayed level of the ASR processing the ASR performs over the audio stream based on the function of the open microphone duration is equal to zero and, when the decayed level of the ASR processing is equal to zero, instructing the microphone to close. Optionally, the operations may also include displaying in a graphical user interface of the voice-enabled device where a graphical indicator indicates the decayed level of ASR processing performed by the ASR system on the audio stream.

Implementations of the system or the method may include one or more of the following optional features. In some implementations, the ASR system initially uses a first processing level to perform the ASR processing over the audio stream upon commencement of the open microphone duration window where the first processing level is associated with full processing capabilities of the ASR system. In these implementations, decaying the level of the ASR processing the ASR system performs over the audio stream based on the function of the open microphone duration window includes determining whether a first interval of time has elapsed since commencing the open microphone duration window and, when the first interval of time has elapsed, decaying the level of the ASR processing the ASR system performs over the audio stream by reducing the level of the ASR processing from the first processing level to a second processing level where the second processing level is less than the first processing level. In some examples, instructing the ASR system to use the decayed level of the ASR processing includes instructing the ASR system to switch from performing the ASR processing on a remote server in communication with the voice-enabled device to performing the ASR processing on the data processing hardware of the voice-enabled device. In some configurations, instructing the ASR system to use the decayed level of the ASR processing includes instructing the ASR system to switch from using a first ASR model to a second ASR model for performing the ASR processing over the audio stream where the second ASR model includes fewer parameters than the first ASR model. Instructing the ASR system to use the decayed level of the ASR processing may include instructing the ASR system to reduce a number of ASR processing steps performed over the audio stream. Instructing the ASR system to use the decayed level of the ASR processing may also include instructing the ASR system to adjust beam search parameters to reduce a decoding search space of the ASR system. Additionally or alternatively, instructing the ASR system to use the decayed level of the ASR processing may include instructing the ASR system to perform quantization and/or sparsification on one or more parameters of the ASR system. In some configurations, instructing the ASR system to use the decayed level of the ASR processing may include instructing the ASR system to switch from system on a chip-based (SOC-based) processing to perform the ASR processing on the audio stream to digital signal processor-based (DSP-based) processing to perform the ASR processing on the audio stream. While the ASR system is using the decayed level of the ASR processing over the audio stream captured by the open microphone, the ASR system is configured to generate a speech recognition result for audio data corresponding to a query spoken by the user and provide the speech recognition result to an application to perform an action specified by the query.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
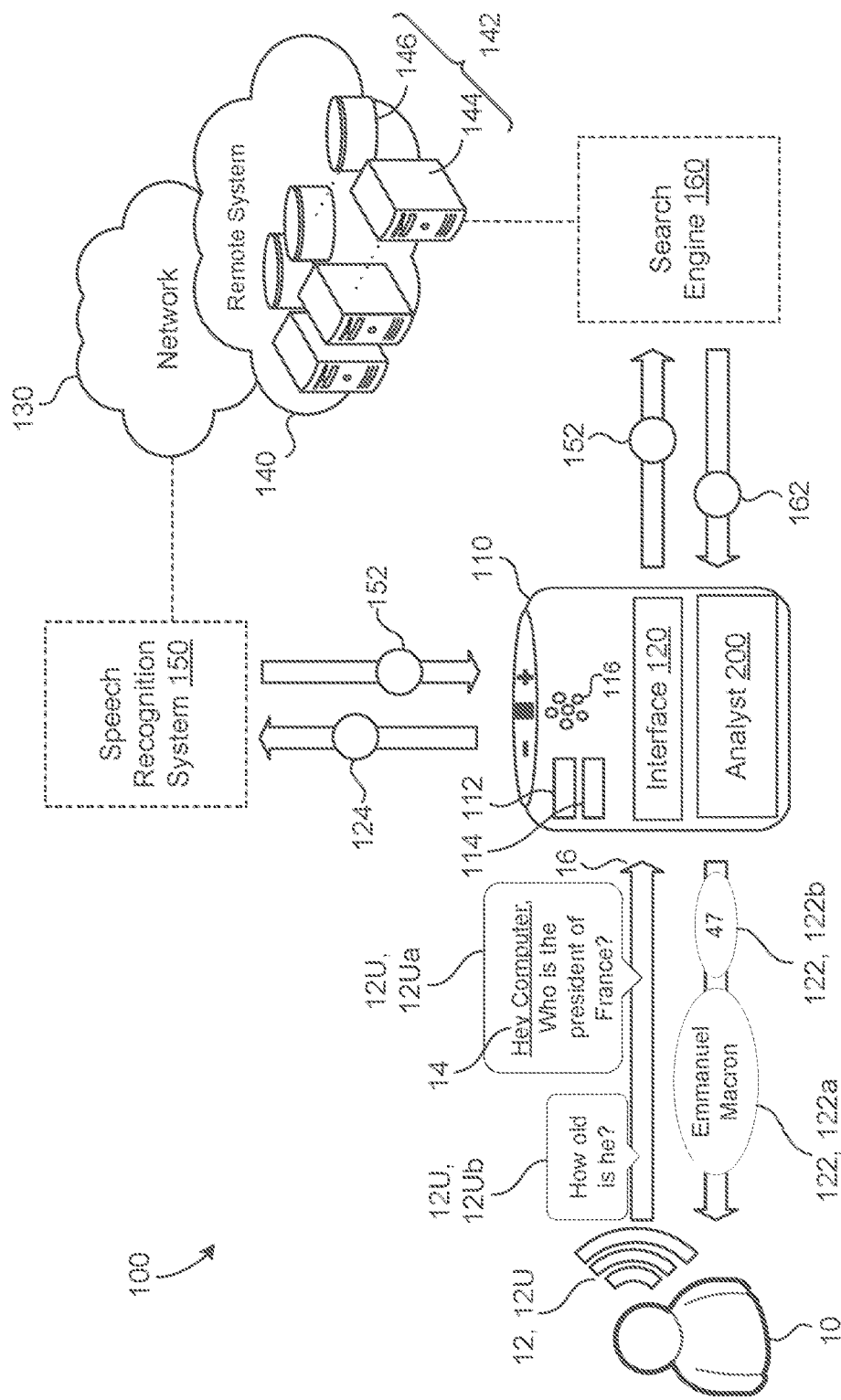
FIG. 1A is a schematic view of an example speech environment for decaying speech processing.

Ideally, when conversing with a digital assistant interface, a user should be able to communicate as if the user were talking to another person, via spoken requests directed toward their voice-enabled device running the digital assistant interface. The digital assistant interface will provide these spoken requests to an automated speech recognizer to process and recognize the spoken request so that an action can be performed. In practice, however, it is challenging for a device to always be responsive to these spoken requests since it is prohibitively expensive to run speech recognition continuously on a resource constrained voice-enabled device, such as a smart phone or smart watch.

Conversations with digital assistant interfaces are typically initiated with a convenient interaction by a user, such as a user speaking a fixed phrase (e.g., a hotword/keyword/wake word) or using some predefined gesture (e.g., raising or squeezing the voice-enabled device). However, once a conversation starts, requiring the user to speak the same fixed phrase or use the same predefined gesture for each successive spoken request/query can be cumbersome and inconvenient for the user. To mitigate this requirement, a microphone of the voice-enabled device can be kept open for some predefined amount of time immediately after an interaction to permit the microphone to capture immediate follow-up queries spoken by the user in a much more natural way. However, there are certain trade-offs for how long the microphone should be kept upon immediately following an interaction. For instance, leaving the microphone open for too long can lead to unnecessarily consuming power for performing speech recognition and increasing the likelihood of capturing unintended speech in the environment of the voice-enabled device. While, on the other hand, closing the microphone too soon creates a bad user experience since a user is required to re-initiate the conversation via the fixed phrase, gesture, or other means which may be inconvenient.

Implementations herein are directed toward initiating a speech recognizer to perform speech recognition responsive to an event by opening a microphone of a voice-enabled device and gradually decaying both the responsiveness and processing power of the speech recognizer. More specifically, implementations herein include decaying a speech recognition processing level based on a probability of user interaction, such as a follow-up query after an initial query, with the voice-enabled device. In contrast to making a binary decision to close the microphone and prevent further processing by the speech recognizer at some arbitrary point in time, decaying processing by the speech recognizer over time improves both the user experience, by keeping the microphone open longer to capture follow-up speech directed toward the voice-enabled device, as well as power consumption savings, by permitting the speech recognizer to run at different power modes depending on a level of confidence an upcoming user interaction.

Figure 1B:
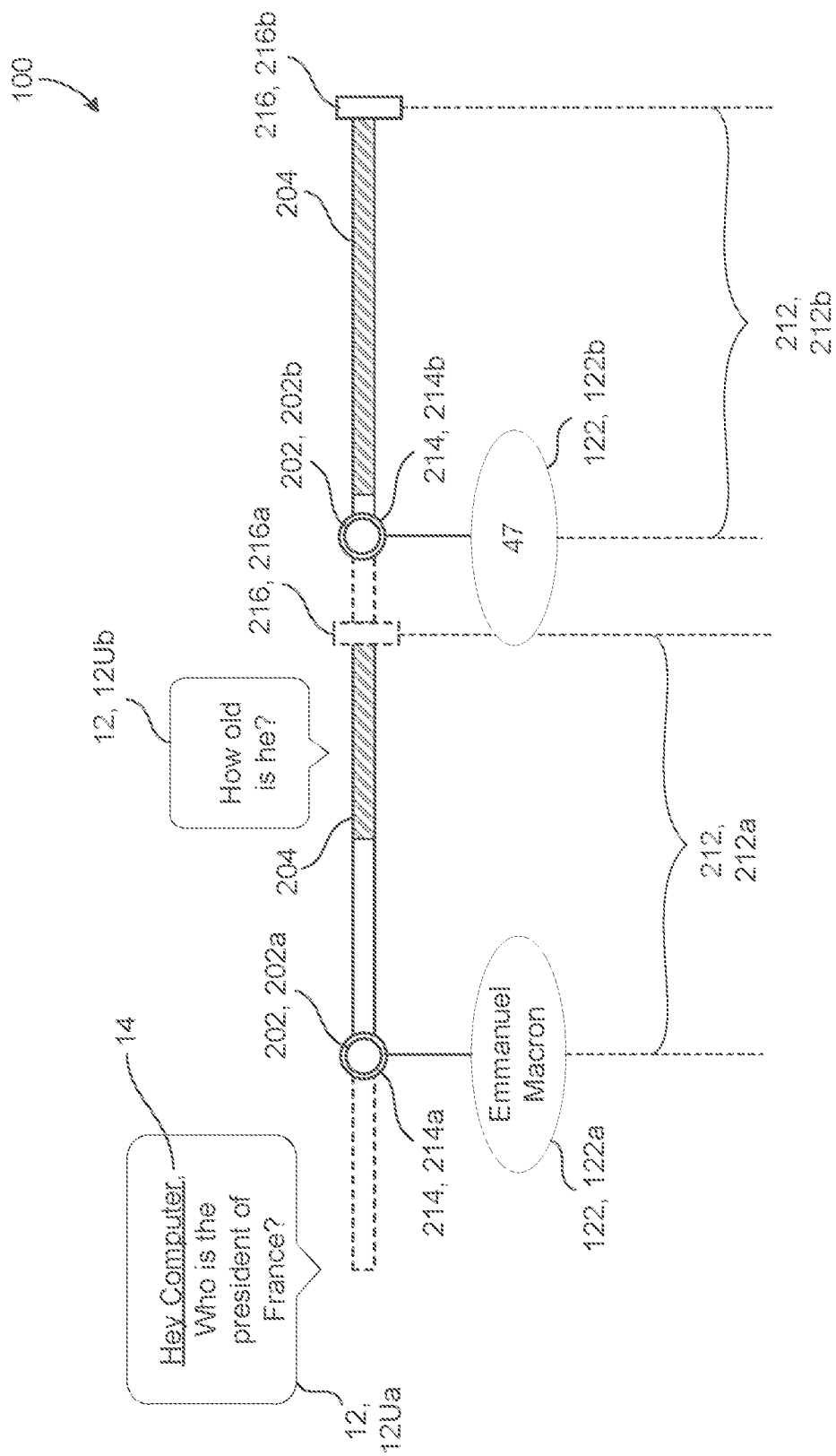
FIG. 1B is a schematic view of an example time sequence for the speech environment of FIG. 1A.

Referring to FIGS. 1A and 1B, in some implementations, the speech environment 100 includes a user 10 providing a user interaction 12 to interact with a voice-enabled device 110 (also referred to as a device 110 or a user device 110). Here, the user interaction 12 is a spoken utterance 12, 12U corresponding to a query or a command to solicit a response from the device 110 or to have the device 110 execute a task specified by the query. In this sense, the user 10 may have conversation interactions with the voice-enabled device 110 to perform computing activities or find answers to questions.

The device 110 is configured to capture user interactions 12, such as speech, from one or more users 10 within the speech environment 100. An utterance 12U spoken by the user 10 may be captured by the device 110 and may correspond to a query or a command for a digital assistant interface 120 executing on the device 110 to perform an operation/task. The device 110 may correspond to any computing device associated with the user 10 and capable of receiving audio signals. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech processing.

The device 110 further includes an audio subsystem with an audio capturing device (e.g., an array of one or more microphones) 116 for capturing and converting audio data within the speech environment 100 into electrical signals. While the device 110 implements the audio capturing device 116 (also referred to generally as a microphone 116) in the example shown, the audio capturing device 116 may not physically reside on the device 110, but be in communication with the audio subsystem (e.g., peripherals of the device 110). For example, the device 110 may correspond to a vehicle infotainment system that leverages an array of microphones positioned throughout the vehicle.

A speech-enabled interface (e.g., a digital assistant interface) 120 may field the query or the command conveyed in the spoken utterance 12U captured by the device 110. The speech-enabled interface 120 (also referred to as interface 120 or an assistant interface 120) generally facilitates receiving audio data 124 corresponding to an utterance 121 and coordinating speech processing on the audio data 124 or other activities stemming from the utterance 12U to generate a response 122. The interface 120 may execute on the data processing hardware 112 of the device 110. The interface 120 may channel audio data 124 that includes an utterance 12U to various systems related to speech processing. For instance, FIG. 1 illustrates that the interface 120 communicates with a speech recognition system 150. Here, the interface 120 receives audio data 124 corresponding to an utterance 12U and provides the audio data 124 to the speech recognition system 150. In some configurations, the interface 120 serves as an open communication channel between the microphone 116 of the device 110 and the speech recognition system 150. In other words, the microphone 116 captures an utterance 12U in an audio stream 16 and the interface 120 communicates audio data 124 corresponding to the utterance 12U converted from the audio stream 16 to the speech recognition system 150 for processing. More specifically, the speech recognition system 150 processes the audio data 124 to generate a transcription 152 for the utterance 12U and may perform semantic interpretation on the transcription 152 to identify an appropriate action to perform. The interface 120 used to interact with the user 10 at the device 110 may be any type of program or application configured to execute the functionality of the interface 120. For example, the interface 120 is an application programming interface (API) that interfaces with other programs hosted on the device 110 or in communication with the device 110.

Referring specifically to the example of FIG. 1A, a first utterance 12U, 12Ua by the user 10 states "Hey computer, who is the president of France?" Here, the first utterance 12U includes a hotword 14 that when detected in the audio data 124 triggers the interface 120 to open the microphone 116 and relay subsequently captured audio data corresponding to the query "who is the president of France?" to the speech recognition system 150 for processing. That is, the device 110 may be in a sleep or hibernation state and run a hotword detector to detect the presence of the hotword 14 in the audio stream 14. Serving as an invocation phrase, the hotword 14 when detected by the hotword detector, triggers the device 110 to wake-up and initiate speech recognition on the hotword 14 and/or one or more terms following the hotword 14. The hotword detector may be a neural network-based model configured to detect acoustic features indicative of the hotword without performing speech recognition or semantic analysis.

In response to the hotword detector detecting the hotword 14 in the audio stream 16, the interface 120 relays the audio data 124 corresponding to this utterance 12Ua to the speech recognition system 150 and the speech recognition system 150 performs speech recognition on the audio data 124 to generate a speech recognition result (e.g., transcription) 152 for the utterance 12Ua. The speech recognition system 150 and/or the interface 120 performs semantic interpretation on the speech recognition result 152 to determine that the utterance 12Ua corresponds to a search query for the identity of the president of France. Here, the interface 120 may submit the transcription 152 to a search engine 160 that searches for, and returns a search result 162 of "Emmanuel Macron" for the query of "Who is the president of France?" The interface 120 receives this search result 162 of "Emmanuel Macron" from the search engine 160 and, in turn, communicates "Emmanuel Macron" to the user 10 as a response 122 to the query of the first utterance 12Ua. In some examples, the response 122 includes synthesized speech audibly output from the device 110.

To perform the functionality of the assistant interface 120, the interface 120 may be configured to control one or more peripherals of the device 110 (e.g., one or more components of the audio subsystem). In some examples, the interface 120 controls the microphone 116 in order to dictate when the microphone 116 is open, or actively receiving audio data 124 for some speech processing purpose, or closed, or not receiving audio data 124 or receiving a restricted amount of audio data 124 for speech processing purposes. Here, whether the microphone 116 is "open" or "closed" may refer to whether the interface 120 communicates audio data 124 received at the microphone 116 to the speech recognition system 150 such that the interface 120 has an open channel of communication with the speech recognition system 150 to enable speech recognition for any utterance 12U included in an audio stream 16 received at the microphone 116 or a closed channel of communication with the speech recognition system 150 to disable the speech recognition system 150 from performing speech recognition over the audio stream 16. In some implementations, the interface 120 designates or instructs whether such a channel is open or closed based on whether the interface 120 receives or has received an interaction 12 and/or an interaction 12 with a trigger 14. For instance, when the interface 120 receives an interaction 12 with a trigger 14 (e.g., a spoken utterance 12U with a hotword), the interface 120 instructs the microphone 116 to open and relays audio data 124 converted from audio captured by the microphone 116 to the speech recognition system 150. After the utterance is complete, the interface 120 may instruct the microphone 116 to close to prevent the speech recognition system 150 from processing additional audio data 124.

In some implementations, the device 110 communicates via a network 130 with a remote system 140. The remote system 140 may include remote resources 142, such as remote data processing hardware 144 (e.g., remote servers or CPUs) and/or remote memory hardware 146 (e.g., remote databases or other storage hardware). The device 110 may utilize the remote resources 142 to perform various functionality related to speech processing. For instance, the search engine 160 may reside on the remote system 140 and/or some of the functionality of the speech recognition system 150 may reside on the remote system 140. In one example, the speech recognition system 150 may reside on the device 110 for performing on-device automated speech recognition (ASR). In another example, the speech recognition system 150 resides on the remote system to provide server-side ASR. In yet another example, functionality of the speech recognition system 150 is split across the device 110 and the server 140. For instance, FIG. 1A depicts the speech recognition system 150 and the search engine 160 in dotted boxes to indicate that these components may reside on-device 110 or server-side (i.e., at the remote system 140).

In some configurations, different types of speech recognition models reside in different locations (e.g., on-device or remote) depending on the model. Similarly, end-to-end or streaming-based speech recognition models may reside on the device 110 due to their space-efficient size while larger, more conventional speech recognition models that are constructed from multiple models (e.g., an acoustic model (AM), a pronunciation model (PM), and a language model (LM)) are server-based models that reside in the remote system 140 rather than on-device. In other words, depending on the desired level of speech recognition and/or desired speed to perform speech recognition, speech recognition may reside on-device (i.e., user-side) or remotely (i.e., server-side).

When the user 10 conversationally engages with the interface 120, it can be rather inconvenient for the user 10 to repeat speaking a same invocation phrase (e.g., hotword) 14 for each interaction 12 where the user 10 desires some feedback (e.g., a response 122) from the interface 120. In other words, requiring the user to speak the same hotword for each of multiple successive queries by the user 10 can be quite cumbersome and inconvenient. Yet unfortunately, it is also a waste of computing resources and can be computationally expensive for the device 110 to be continuously running speech recognition on any audio data 124 received at the microphone 116.

In order to address the inconvenience of requiring the user 10 to repeat speaking the hotword 14 each time the user 10 wants to communicate a new query 14 while the user 10 is actively having a conversation (or session of interactions 12) with the interface 120, the interface 120 may allow the user 10 to provide follow-up queries after the interface 120 responds to a previous query without requiring the user 10 to speak the hotword 14. That is, a response 122 to a query may serve as an indication of a microphone trigger event 202 (FIG. 1B) indicating a possible user interaction 12 with the voice-enabled device 110 through speech, and thereby cause the device 110 to instruct the microphone 116 to open or remain open for capturing the audio stream 16 and providing the captured audio stream 16 to the speech recognition system 150 to perform speech recognition processing on the audio stream 16. Here, the microphone 116 may be open to accept a query from the user 10 without requiring the user 10 to first speak the hotword 14 again to trigger the microphone 116 to open to accept the query.

The microphone trigger event 202 (also referred to as a trigger event 202) generally refers to the occurrence of an event that indicates that the user 10 may possibly interact with the device 110 via speech, and therefore requires activation of the microphone 116 to capture any speech for speech processing. Here, since the trigger event 202 indicates a possible user interaction 12, the trigger event 202 may range from a gesture to a recognized user characteristic (e.g., pattern of behavior) to any action by user 10 that the device 110 may distinguish as a potential interaction 12. For instance, a user 10 may have a routine during the work week where, when the user 10 enters the kitchen, the user 10 queries the device 110 for the weather and whether there are any events on the user's calendar. Due to this pattern of behavior, the device 110 may recognize the user 10 entering kitchen (e.g., hear the movement in the direction of a kitchen entryway) around a particular time and treat the action of the user 10 entering the kitchen in the morning as a trigger event 202 of a possible user interaction 12. In the case of a gesture, the trigger event 202 may be an interaction 12 where the user 10 raises the device 110, squeezes the device 110, presses a button on the device 110, taps a screen of the device 110, moves hand in a predefined manner, or any other type of pre-programmed gesture to indicate that the user 10 may intend to engage in a conversation with the assistant interface 120. Another example of a trigger event 202 is when the device 110 (e.g., the interface 120) communicates a response 122 to a query from the user 10. In other words, when the interface 120 relays a response 122 to the user 10, the response 122 serves as a communication interaction to the user 10 on behalf of the device 110; meaning that a follow-up query spoken by the user 10 may likely ensue after receiving the response 122 or simply occur because the user 10 is currently conversing with the device 110. Based on this likelihood, the response 122 may be considered a trigger event 202 such that the microphone 116 either opens or remains open to capture and allow for speech processing of a follow-up query spoken by the user 10 after the device 110 outputs a response 122 without requiring the user 10 to prefix the follow-up query with a hotword 14.

To implement the microphone trigger event 202 and to provide a conversation between the device 110 and the user 10 without compromising processing resources, the device 110 deploys an interaction analyst 200 (also referred to as the analyst 200) that recognizes that the user 10 is addressing the assistant interface 120 while also maintaining speech recognition throughout the conversation with the user 10. In other words, the analyst 200 may provide endpointing functionality by identifying when a conversation between the user 10 and the interface 120 begins and when it is best to assume that the conversation has ended to endpoint the interaction 12 and deactivate speech recognition. Furthermore, in addition to endpointing, the analyst 200 may also modify the process of speech recognition by reducing a processing level 222 (FIGS. 2A and 2B) for speech recognition (i.e., using the speech recognition system 150) depending on the nature of one or more interactions 12 by the user 10. Specifically, the analyst 200 may be able to instruct the speech recognition system 150 to use a decayed level 222 of speech recognition over the audio stream 16 captured by the microphone 116. For example, when the device 110 instructs the microphone 116 to open or remain open for an open microphone duration window to capture and provide an audio stream 16 to the speech recognition system 150 responsive to receiving an indication of a microphone trigger event 202, the analyst 200 may decay the level 222 of speech processing that the speech recognition system 150 performs over the audio stream 16 as a function of the open microphone duration window 212. Here, the analyst 200 operates in conjunction with the interface 120 to control speech recognition and/or speech-related processes.

Referring to FIG. 1I, when the device 110 (e.g., the interface 120) receives an indication of the trigger event 202, the interface 120 instructs the microphone 116 to open or remain and communicates audio data 124 associated with the audio stream 16 captured by the microphone 116 to the speech recognition system 150 for processing. Here, when the interface 120 instructs the microphone 116 to open, the analyst 200 may be configured to designate that the microphone 116 continues to stay open after commencement by the trigger event 202 for some open microphone duration window 212. For example, the open microphone duration window 212 designates a period of time for which the interface 120 will communicate the audio stream 16 of audio data 124 captured by the microphone 116 to the speech recognition system 150. Here, the microphone duration window 212 refers to a set duration of time that commences upon receipt of the trigger event 202 and ceases (e.g., undergoes a microphone closing event) after the set duration of time. In some examples, the analyst 200 may instruct the interface 120 to extend the microphone duration window 212 or to refresh (i.e., renew) the microphone duration window 212 when the interface 120 receives another trigger event 202 (e.g., a subsequent trigger event 202) during the microphone duration window 212. To illustrate, FIGS. 1A and 1B depict that the user 10 generating a first utterance 12Ua stating "Hey computer, who is the president of France?" and a second utterance 12U, 12Ub of "how old is he?" as a follow-up question to the response 122 that the president of France is Emmanuel Macron. Referring specifically to FIG. 1B, the hotword 14 of "hey computer" corresponds to a set phrase that initiates speech recognition for the succeeding portion of the utterance, "who is the president of France?" When the interface 120 responds with "Emmanuel Macron," the analyst 200 establishes the response 122 as a microphone trigger event 202 that initiates a first microphone duration window 212, 212a to commence. Here, the window 212 may have a duration defined by a start point 214 and an end point 216 where at the time of the end point 216, the microphone duration window 212 expires and the interface 120 and/or the analyst 200 performs a microphone closing event. Yet in this example, the user 10 asks a follow-up question of "how old is he?" prior to the originally designated end point 216a, 216 of the first microphone duration window 212a. Due to the follow-up question (i.e., another user interaction 12) of the second utterance 12Ub, the interface 120 generates a second response 122, 122b that states that the age of Emmanuel Macron is "47." Similar to the first response 122, 122a of "Emmanuel Macron," the second response 122, 122b is a second trigger event 202, 202b that commences a new microphone duration window 212, 212b as a second microphone duration window 212b even though the first microphone duration window 212a may or may not have expired (e.g., FIG. 1B illustrates that the first window 212a expired prior to the second response 122b). When the interface 120 initiates a new microphone duration window 212 while a microphone duration window 212 is still pending, this may be considered extending the pending window 212 or allowing the pending window 212 to remain open. In some implementations, when a duration window 212 is still pending, a trigger event 202 during that window 212 may not entirely renew the duration window 212 i.e., begin the duration window anew), but rather extend the pending duration window 212 by some designated amount of time. For instance, if the duration window 212 is ten seconds and the duration window 212 is currently pending, a trigger event 202 during this pending duration window 212 extends the pending window 212 an additional five seconds rather than new additional full ten seconds. In FIG. 1B, the first window 212a expires prior to the second response 122b such that the second trigger event 202b commences an entirely new duration window 212, 212b at the second start point 214, 214b, which will end (unless, for example, one or more additional trigger events 202 occur) at the second end point 216, 216b.

With continued reference to FIG. 1B, the analyst 200 is configured to additionally generate a decay state 204 during some portion of the window 212. For instance, by transitioning to a decay state 204, the processing level 222 for speech recognition may be modified (e.g., reduced by some amount) during the window 212. In other words, the level 222 of speech processing performed by the speech recognition system 150 on the audio data 124 may be based on a function of the window 212. By basing the level 222 of speech processing (e.g., for speech recognition) on the window 212, the amount of speech processing performed over an audio stream 16 of audio data 124 becomes a function of time. Meaning that, as time passes and it appears less likely that a conversation between the interface 120 and the user 10 is still ongoing (e.g., the audio data 124 does not include user speech or speech not directed toward the device 110), the analyst 200 recognizes this decreasing likelihood and reduces speech recognition accordingly. For instance, FIG. 1B illustrates that during the final half of the first microphone duration window 212a, speech processing transitions to a decay state 204 where the level 222 of speech processing is reduced. This approach may allow the analyst 200 and/or interface 120 to reduce the amount of computing resources being used to perform speech processing at the device 110. Similarly, in this example of FIG. 1B, even though the user 10 generates a follow-up question of "how old is he?" during the final third of the first window 212a when the analyst 200 has transitioned speech recognition to the decay state 204, the analyst 200 determines that the decay state 204 for the second window 212b should occur more quickly because speech recognition was already in a decay state 204 in the first window 212 and it was already somewhat unlikely that the user 10 was going to perform a second interaction 12Ub; therefore, the analyst 200 determines that the decay state 204 should occur for a longer period of time in the second duration window 212b, for example, about 90% of the second duration window 212b. By utilizing the analyst 200, the device 110 and/or the interface 120 strive to strike a balance between maintaining the ability to perform speech recognition without a hotword 14 while also trying to avoid actively performing speech recognition when it is unlikely that the user 10 intends to further interact with the assistant interface 120.

Figure 2A:
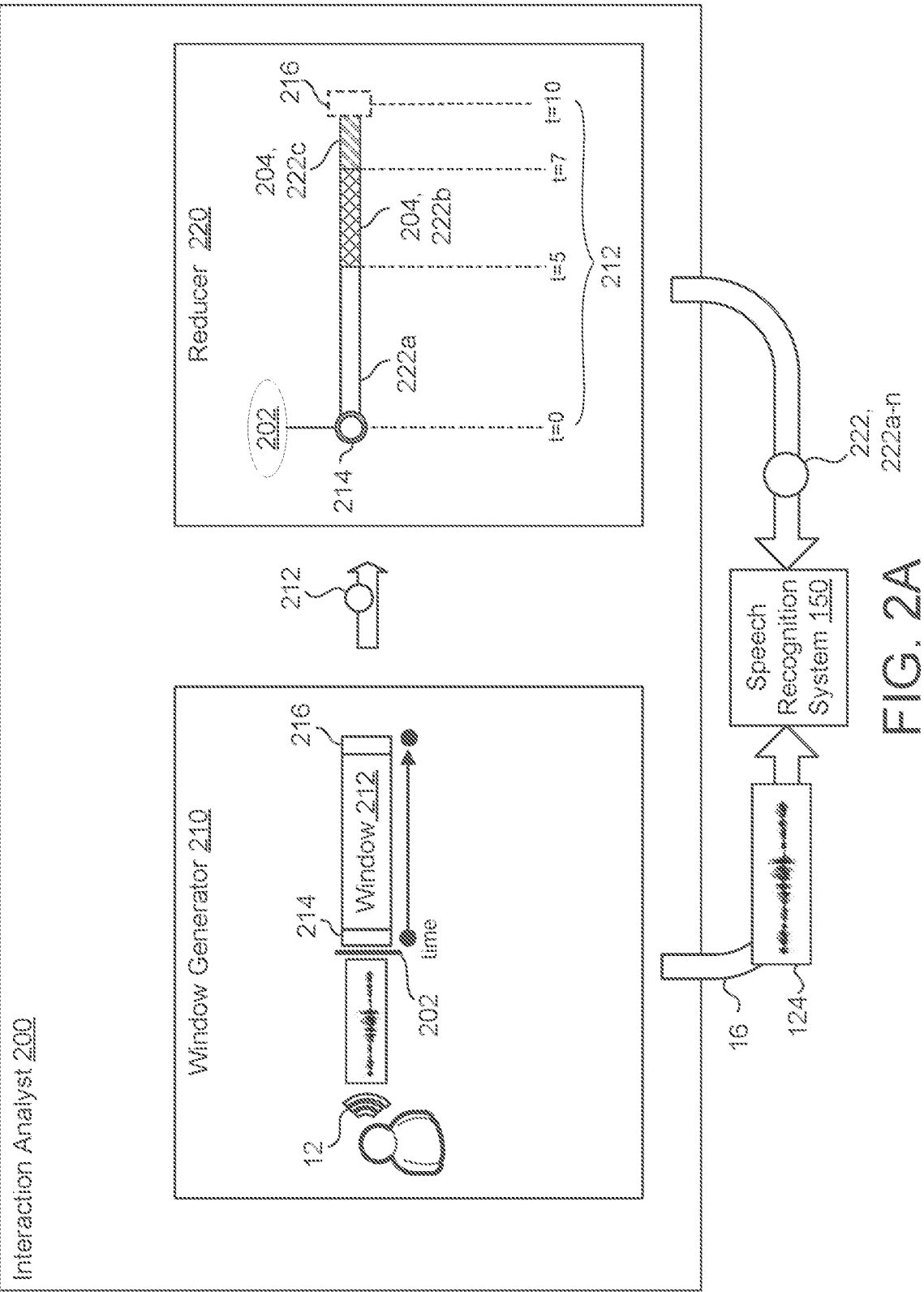
FIGS. 2A and 2B are schematic views of example interaction analysts for decaying speech processing.
Figure 2B:
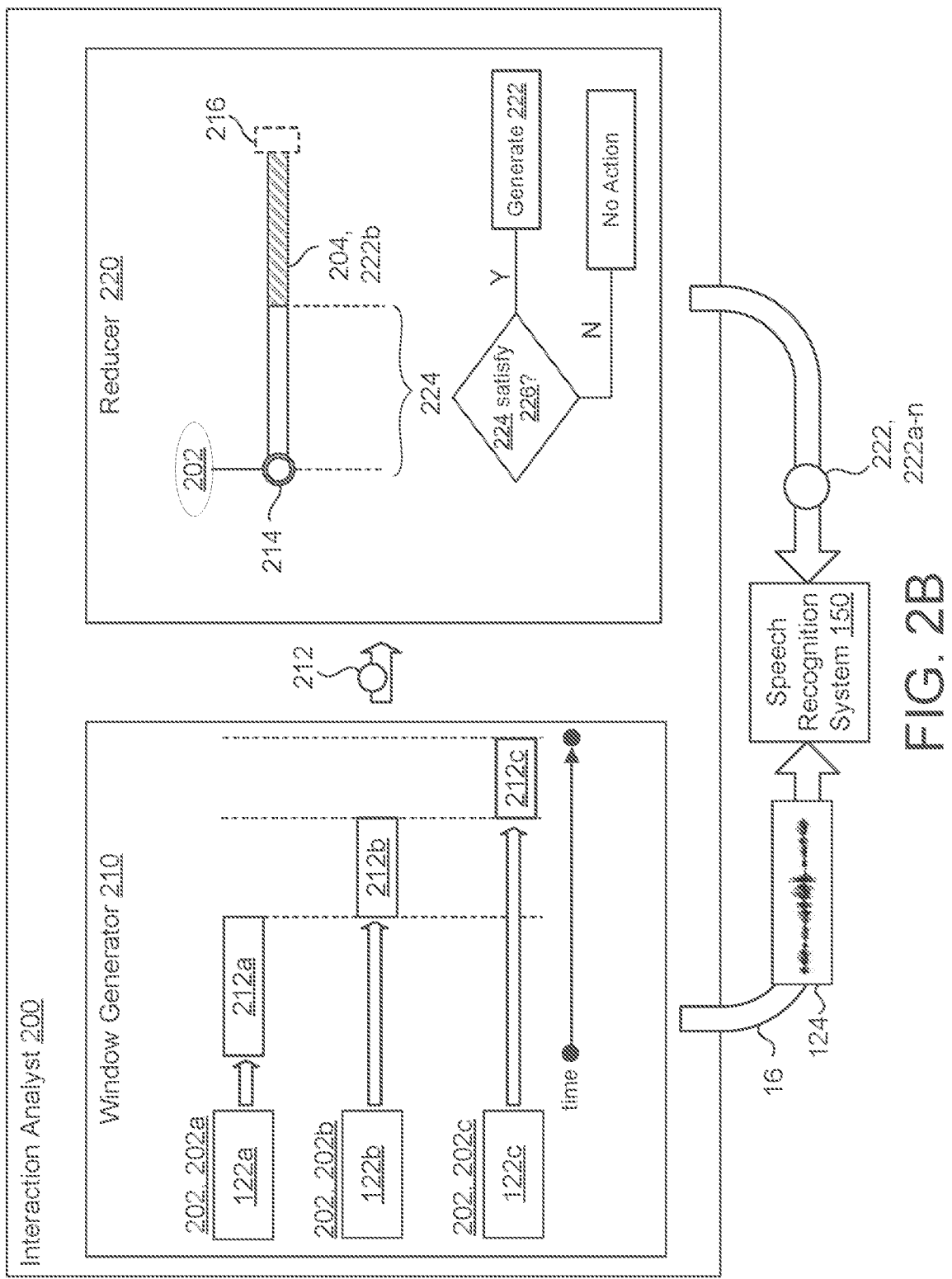

Referring to FIGS. 2A and 2B, the analyst 200 generally includes a window generator 210 and a reducer 220. The window generator 210 (also referred to as a generator 210) is configured to generate the open microphone duration window 212 that dictates a time duration for the microphone 116 to be open for capturing and providing an audio stream 16 to the speech recognition system 150 for processing. Each microphone duration window 212 includes a start point 214 designating a time for the beginning of the microphone duration window 212 when the audio stream 16 received at the microphone 116 begins to be sent to the speech recognition system 150 for processing and an end point 216 designating a time when the open microphone duration window 212 ends and the audio stream 16 thereafter is no longer communicated to the speech recognition system 150 for processing. The window generator 210 initially generates the open microphone duration window 212 when it is determined that the interface 120 receives a trigger event 202 from the user 10.

In some implementations, the window generator 210 is configured to generate different sized windows 212 (i.e., windows 212 having different lengths of time) based on a configuration of the analyst 200 or intelligently based on the conditions occurring at the microphone 116. For instance, an administrator of the analyst 200 sets a default duration for a window 212 generated by the window generator 210 (e.g., each window 212 is ten seconds long). In contrast, the generator 210 may recognize patterns of behavior by a user 10 or aspects/features of an utterance 12U by the user 10 and intelligently generate a window 212 having a size to match or to correspond to these recognized characteristics. For instance, it may be common for a particular user 10 to engage in multiple questions after each time that the particular user 10 generates the trigger 14 to start a conversation with the interface 120. Here, a speech processing system associated with the device 110 may identify the identity of the user 10 and based on this identify, the generator 210 generates a window 212 with a size that corresponds or caters to the interaction frequency for that user 10 during the interaction session (i.e., conversation with the interface 120). For instance, instead of the generator 210 generating a default window 212 having a five second duration, the generator 210 generates a window 212 having a ten second duration because the user 10 that submitted the hotword 14 tends to generate a higher frequency of interactions 12 with the interface 120. On the other hand, if the user 10 that submitted the hotword 14 tends to only ask a single query whenever he or she interacts with the interface 120, the generator 210 may receive this behavior information about the user 10 and shorten the default window 212 from five seconds to a custom window 212 of three seconds.

The generator 210 may also generate a custom open microphone duration window 212 based on aspects or features of an utterance 12U or a response 122 to the utterance 12U. As a basic example, the user 10 speaks an utterance 12U that states "hey computer, play the new Smashing Pumpkins album, Cyr." Yet when the interface 120 attempts to respond to this command, the interface 120 determines that the new Smashing Pumpkins album, Cyr, is being released later in the month and provides a response 122 indicating that the album is not currently available. The response 122 may further ask if the user 10 wants to listen to something else. Here, following the response 122 by the interface 120, the generator 210 may generate a larger window 212 (i.e., a window 212 lasting a longer duration of time) or may extend an initially generated window 212 automatically based on the fact that the interface 120 and/or device 110 determines there is a high likelihood that there is a follow-up interaction 12 by the user 10 when the interface 120 generates a response 122 that the requested album is not available. In other words, the interface 120 and/or device 110 intelligently recognizes it is likely the user 10 will submit another music request following the response 122 due to the results of the command by the user 10.

As FIG. 1B illustrates, the generator 210 not only generates a window 212 when the trigger event 202 is initially received (e.g., when the interface 120 communicates the response 122), but also may generate a new window 212 or extend a window 212 that is currently open when an trigger event 202 is received by the interface 120 during an open window 212. By generating a new window 212 when a trigger event 202 is received during an open window 212 or extending an open window 212, the generator 210 functions to continue keeping the window 212 open when the conversation between the user 10 and the interface 120 is ongoing.

In some examples, such as FIG. 2B, when the generator 210 extends a window 212 or generates a new window 212 in an ongoing conversation, the generator 210 is configured to discount the duration of the window 212. For instance, the generator 210 is configured to generate subsequent windows 212 of shorter duration after each subsequent interaction 12 by the user 10. This approach may account for the fact that a second or follow-up interaction 12 has a first probability of occurring after an initial interaction 12, but thereafter the probability decreases that additional interactions 12 will occur. For instance, after an initial query in the first utterance 12Ua, a follow-up query in the second utterance 12Ub may occur about 20% of the time, but a third utterance 12U after the follow-up query in the second utterance 12Ub only occurs about 5% of the time during an interaction session between the user 10 and the interface 120. Based on this pattern, the generator 210 may decrease the size of the window 212 or how long an open window 212 is extended as a function of this probability that another trigger event 202 (i.e., possible interaction 12) occurs. For example, FIG. 2B illustrates three trigger events 202, 202a-c where each trigger event 202 corresponds to a subsequent response 122 (e.g., three responses 122a-c) from the interface 120 such that the generator 210 generates a first window 212a for the first trigger event 202a followed by a second window 212b for the second trigger window 202b that occurs after the first trigger window 202a and then followed by a third window 212c for the third trigger event 202c that occurs after the second trigger event 202b. In this example, the generator 210 shortens the generated window 212 such that the third window 212c has a shorter duration than the second window 212b, which has a shorter duration than the first window 212a Additionally or alternatively, the generator 210 may analyze the audio data 124 of the audio stream 16 to determine whether the voice activity level in the audio data 124 provides any indication that a trigger event 202 is likely to occur. With this information, the generator 210 may modify the size of the current open window 212 or modify the size of any subsequently generated/extended window 212.

The reducer 220 is configured to designate the processing level 222 of speech recognition that should be performed on the audio stream 16 of audio data 124. The processing level 222 may be based on several variables that include, but are not limited to, the type of speech recognition model that performs the speech recognition for the speech recognition system 150, the location where speech recognition occurs, the speech recognition parameters used to perform speech recognition, whether the speech model is designated to operate at full capability or in some lesser degree of capability, etc. The processing level 222 may generally refer to the amount of computing resources (e.g., local resource such as the data processing hardware and memory hardware or remote resources) that are being dedicated or consumed by speech processing, such as speech recognition, at any given time. This means that a first processing level 222 in a first state is less than a second processing level 222 in a second state when, for example, the amount of computing resources or computing power being dedicated to speech processing in the first state is less than in the second state.

In some examples, when speech recognition occurs at a reduced processing level 222 (e.g., when compared to maximum processing capabilities), the reduced processing level 222 may function as a first pass to recognize speech, but then result in a second pass with a processing level 222 higher than the first pass. For instance, when the speech recognition system 150 is operating at a reduced processing level 222, the speech recognition system 150 identifies a low confidence speech recognition result (e.g., low confidence hypothesis) that the audio data 124 contains an utterance 12U to command or query the interface 120. Due to this low confidence speech recognition result, the reducer 220 may increase the processing level 222 such that it may be determined at a higher processing level 222 whether the low confidence speech recognition result actually corresponds to a higher confidence speech recognition result (e.g., high confidence hypothesis) that the audio data 124 contains an utterance 12U to command or query the interface 120. In some examples, a low confidence speech recognition result is a speech recognition result that fails to satisfy a confidence threshold during speech recognition. In other words, the reducer 220 may change the processing level 222 based not only on the variables mentioned above, but also based on the results obtained during speech recognition at a particular processing level 222.

In some implementations, the reducer 220 designates the processing level 222 as a function of the window 212. That is, the reducer 220 is able to reduce the processing level 222 for speech recognition when an open microphone duration window 212 exists. For instance, when the window 212 corresponds to a duration of ten seconds (e.g., as shown in FIG. 2A), during the first five seconds of the window 212, the reducer 220 instructs the speech recognition system 150 to operate at full power/processing (e.g., a first processing level 222, 222a) for speech recognition. After these five seconds occur at full processing, the speech processing transitions to a decay state 204 where the processing level 222 is reduced to some degree less than full processing. As an example, from five seconds to seven seconds into the duration of the window 212, the reducer 220 instructs the speech recognition system 150 to perform at a second processing level 222, 222b that corresponds to 50% of full processing for the speech recognition system 150. Then, after the seventh second of the duration and until the end of the duration for the window 212, the reducer 220 instructs the speech recognition system 150 to perform at a third processing level 222, 222c corresponding to 25% of full processing for the speech recognition system 150. Thus, the reducer 220 controls the processing level 222 of the speech recognition system 150 during the open microphone duration window 212.

In some implementations, the generator 210 and the reducer 220 work in conjunction such that the duration of the window 212 depends on the decay state 204. The generator 210 may not generate an end point 216 at a designated time, but rather allow the reducer 220 to reduce the processing level 222 to a level that has the same effect as closing the microphone 116. For example, after the third processing level 222c corresponding to 25% of full processing for the speech recognition system 150, the reducer 220 then closes the microphone 116 because another 25% reduction in processing reduces the processing level 222 to 0% of full processing for the speech recognition system 150 (i.e., no processing or "closed"). This particular example is a tiered approach that steps the processing level 222 down in discrete increments, but other types of decay are possible to result in a closed microphone 116. For instance, the processing level 222 may decay linearly at any point during the open microphone duration window 212. By allowing the reducer 220 to reduce the processing level 222 until the microphone 116 is closed, this technique may advance the continuous decaying of speech processing (e.g., when no interaction 12 is occurring and the microphone 116 is open).

In some configurations, such as FIG. 2B, the processing level 222 within a window 212 is based on a time when the interface 120 received the last trigger event 202 by the user 10. In these configurations, the reducer 220 may determine whether a time period 224 from when the interface 120 received the last trigger event 202 to the current time satisfies a time threshold 226. When the time period 224 satisfies a time threshold 226 (i.e., the no interaction 12 has occurred for a threshold amount of time), the reducer 220 may generate a processing level 222 at the current time. For instance, if the interface 120 sent a response 122 to an utterance 12U by the user 10, the window 212 began when the interface 120 communicated the response 122. When the time threshold 226 is set to five seconds, the reducer 220 determines whether five seconds have elapsed from when the interface 120 communicated the response 122. When the reducer 220 determines that five seconds have elapsed, the reducer 220 may then designate some processing level 222 for speech recognition starting, for example, at the current time when the reducer 220 determined that the five seconds had elapsed or some particular time thereafter.

In some configurations, the processing level 222 changes by adjusting one or more parameters of the speech recognition system 150. In one approach to change the processing level 222 of speech recognition at the speech recognition system 150, speech recognition is changed as to the location where it occurs. The location of speech recognition may change from occurring server-side (i.e., remotely) to on-device (i.e., locally). In other words, a first processing level 222a corresponds to remote speech recognition using a server-based speech recognition model while a second processing level 222b corresponds to local speech recognition occurring on-device. When a speech recognition system 150 is hosted "on-device," the device 110 receives the audio data 124 and uses its processor(s) (e.g., data processing hardware 112 and memory hardware 114) to execute the functionality of the speech recognition system 150. Speech recognition that uses a server-based model may be considered to have a greater processing level 222 than an on-device speech recognition model because the server-based model may leverage a greater number of remote processing resources (e.g., along with other costs such as bandwidth and transmission overhead). With a greater amount of processing, the server-based model may be potentially larger in size than an on-device model and/or perform decoding using a larger search graph than an on-device model. For instance, a server-based speech recognition model may leverage multiple, larger models (e.g., an acoustic model (PM), a pronunciation model (PM), and a language model (PM)) that may be particularly trained for a dedicated speech recognition purpose whereas an on-device model often has to consolidate these different models into a smaller package to operate effectively and space efficiently on the finite processing resources of the device 110. Therefore, when the reducer 220 reduces the processing level 222 to a decay state 204, the reducer 220 may change speech recognition from occurring remotely using a server-based model to locally using an on-device model.

In some situations, there may be more than one device 110 nearby a user 110 who is generating an interaction 12 such as a spoken utterance 12U. When multiple devices 110 are located in the vicinity of the user 10, each device 110 may be able to perform some aspect of speech recognition. Since multiple devices 110 performing speech recognition on the same spoken utterance 12U may be duplicative, the reducer 220 may reduce the processing level 222 at a particular device 110 by closing the microphone 116 for that device 110 knowing that another device 110 is handling or configured to handle the speech recognition. To illustrate, when the user 10 has a mobile device and a smart watch, both devices 110 may be able to perform speech recognition. Here, the reducer 220 may close the microphone 116 for speech recognition at the mobile device to conserve the mobile device's processing resources for the wide range of other computing tasks that the mobile device may need to perform. For instance, the user 10 may prefer to conserve battery power for his or her mobile device rather than his or her smart watch. In some examples, when there are multiple devices, the reducer 220 may try to determine characteristics (e.g., current processor consumption, current battery life, etc.) of each device 110 to identify which device 110 is most optimal to have a microphone 116 that stays open and which device(s) are most optimal to have their microphones 116 closed.

Besides there being a processing level difference between a remote speech recognition system 150 and an on-device speech recognition system 150, there may be different versions of the on-device speech recognition model or the server-side speech recognition model. With different versions, the reducer 220 may change the processing level 222 by changing the model or the version of the model being used for speech recognition. Broadly speaking, a model may have a large version with a high processing level 222, a medium version with a moderate processing level 222, and a small version with a low processing level 222. In this sense, if the reducer 220 wants to reduce the processing level 222, the reducer 220 may transition the speech recognition from being performed at a first version of the model to a second version of the model with a lower processing level 222 than the first version of the model. In addition to changing between versions of either an on-device model or a server-side model, the reducer 220 may also change from one version of a server-side model to a particular version of an on-device model. By having models and versions of these models, the reducer 220 has a greater number of processing levels 222 at its disposal in order to decay the speech recognition processing level 222 during an open microphone window 212.

In some implementations, versions of the on-device speech recognition model have different processing demands such that reducer 220 may designate such versions for different processing levels 222. Some examples of on-device speech recognition models include sequence-to-sequence models such as recurrent neural network transducers (RNN-T) models, listen-attend-spell (LAS) models, neural transducer models, monotonic alignment models, recurrent neural alignment (RNA) models, etc. There may also be on-device models that are hybrids of these models, such as a two-pass model that combines an RNN-T model and a LAS model. With these different versions of on-device models, the reducer 220 may rank or identify the processing requirements of each of these versions in order to generate different processing levels 222. For instance, a two-pass model includes a first-pass of an RNN-T network followed by a second-pass of a LAS network. Since this two-pass model includes multiple networks, the reducer 220 may designate the two-pass model as a large on-device model that has a relatively high processing level 222 for speech recognition. To reduce the processing level 222 of speech recognition from the processing level 222 of a two-pass model, the reducer 220 may change from the two-pass model to an LAS model. Here, an LAS model is an attention-based model that performs attention during its decoding process to generate a character sequence that forms the transcription 152. Generally speaking, attention-based approaches tend to be more computationally intensive to focus attention on particular features for a given speech input. For comparison, an RNN-T model does not employ an attention mechanism and also performs its beam search through a single neural network instead of a large decoder graph, thus, the RNN-T model may be more compact than an LAS model and less computationally expensive. For these reasons, the reducer 220 may change between the two-pass model, the LAS model, and the RNN-T model for speech recognition in order to reduce processing levels 222. That is, the two-pass model, by employing both the RNN-T network as a first pass and rescoring the first pass with a LAS network as a second pass, has a higher processing level 222 than either of the LAS model or the RNN-T models alone while the LAS model, as an attention-based model, has a higher processing level 222 than the RNN-T model. By identifying the processing requirements of speech recognition for different versions of on-device speech recognition models, the reducer 220 is able to decay speech processing (or increase processing) by switching among any of the different versions of on-device models. Moreover, when the reducer 220 combines the processing level options for on-device models with processing level options for server-side models, the decay of speech processing by the reducer 220 has a multitude of potential processing level gradations.

To expand the potential number of processing level gradations further, the reducer 220 may be configured to modify speech processing steps or speech processing parameters for a given model to change the processing level of that particular model. For instance, a particular model includes one or more layers of a neural network (e.g., a recurrent neural network with layers of long-short-term memory (LSTM)). In some examples, an output layer may receive information from past states (backwards) and future states (forward) in order to generate its output. When a layer receives backwards and forwards states, the layer is considered to be bidirectional. In some configurations, the reducer 220 is configured to modify the processing steps of a model to change a speech recognition model from operating bi-directionally (i.e., forward and backward) to simply uni-directionally (e.g., forward). Additionally or alternatively, the reducer 220 may reduce the number of neural network layers that a model uses to perform speech recognition in order to change the processing level 222 of a particular model.

The reducer 220 may also reduce the processing level 222 for a speech recognition model by altering beam search parameters (or other pruning/search mode parameters) for the model. Generally speaking, a beam search includes a beam size or beam width parameter that specifies how many of the best potential solutions (e.g., hypotheses or candidates) to evaluate in order to generate a speech recognition result. The beam search process, therefore, performs a type of pruning of potential solutions to reduce the number of solutions evaluated to form the speech recognition result. That is, the beam search process can limit the computation involved by using a limited number of active beams to search for the most likely sequence of words spoken in an utterance 12U to produce the speech recognition result (e.g., the transcription 152 of the utterance 12U). Here, the reducer 220 may adjust the beam size to reduce the number of best potential solutions to evaluate, which, in turn, reduces the amount of computation involved in the beam search process. For instance, the reducer 220 changes the beam size from five to a beam size of two to have the speech recognition model evaluate 2-best candidates rather than 5-best candidates.

In some examples, the reducer 220 performs quantization or sparsification on one or more parameters for a speech recognition model in order to generate a lower processing level 222 for the model. When generating speech recognition results, a speech recognition model typically generates a large number of weights. For example, the speech recognition model weights different speech parameters and/or speech-related features in order to output a speech recognition result (e.g., the transcription 152). Due to this large number of weights, the reducer 220 may discretize the values of these weights by performing quantization. For instance, a quantization process converts floating point weights to weights represented as fixed point integers. Although this quantization process loses some information or quality, it allows the resources processing these quantized parameters to use less memory, and may allow for more efficient operations to be performed (e.g., multiplications) on certain hardware.

In a similar respect, sparsification also aims to reduce the amount of processing to run the model. Here, sparsification refers to a process of removing redundant parameters or features in a speech recognition model in order to focus on more relevant features. For example, while determining a speech recognition result, a speech model may determine probabilities for all speech-related features (e.g., characters, symbols, or words) even though not all speech-related features are relevant to a certain speech input. By using sparsification, the model may spend less computational resources by determining probabilities for speech-related features that are relevant to the input instead of all speech-related features, allowing the sparsification process to ignore speech-related features that are not relevant to the input.

Optionally, the reducer 220 may generate a lower processing level 222 for speech recognition by determining the context of an interaction 12 (e.g., spoken utterance 12U) that originally generated or led to the open microphone duration window 212. Once the reducer 220 identifies the context, the reducer 220 may use the context to reduce the processing level 222 for a speech recognition system 150 by biasing a speech recognition result based on the context. In some implementations, the reducer 220 biases the speech recognition result based on context by limiting the speech recognition system 150 to vocabulary related to the context. As an example, the user 10 may ask the interface 120, "how do you tie a prusik hitch?" From this question, the reducer 220 determines that prusik hitches are predominantly used in mountaineering or rock climbing. In other words, the reducer 220 identifies that the context of the interaction 12 is mountaineering. In this example, when the reducer 220 proceeds to reduce the processing level 222 for speech recognition, the reducer 220 limits the speech recognition output to vocabulary related to mountaineering. Therefore, if the user 10 subsequently asks a follow-up question about the Appalachian Mountains, the speech recognition system 150 may generate possible speech recognition results that include the term "Application" and "Appalachian," but since "Appalachian" is related to the context of "Mountaineering," the reducer 220 ensures that speech recognition system 150 is biased towards the term "Appalachian." For instance, the reducer 220 instructs the speech recognition system 150 to increase the probability score of potential results that relate to the identified context (e.g., mountaineering). In other words, the speech recognition system 150 increases the probability score for potential results with vocabulary related to mountaineering.

When the speech recognition system 150 is operating on the device 110, the speech recognition system 150 may generally use a system on chip-based (SOC-based) processor to perform speech recognition. A system on chip (SOC) processor refers to a general processor, a signal processor, as well as additional peripherals. The reducer 220 may generate a reduced processing level 222 when speech recognition uses SOC-based processing by instructing the speech recognition system 150 to change from SOC-based processing to a digital signal processor (DSP). Here, this change results in a lower processing level 222 because DSPs tend to consume lower power and memory than SOC-based processing.

As the reducer 220 decays the processing level 222 for speech recognition, it may be advantageous to provide some degree of indication to the user 10 that the decay is occurring. To provide this indication, a graphical user interface (GUI) associated with the device 110 may include a graphical indicator to indicate the current processing level 222 of the speech recognition system 150. In some examples, the graphical indicator has a brightness level that is configured to fade proportionally with the decay of the processing level 222. For instance, a screen of the device 110 includes a GUI that shows a red microphone dot to indicate that the microphone 116 is open (i.e., listening for interactions 12) which gradually fades out as the reducer 220 decays the processing level 222 for speech recognition. Here, when the microphone 116 closes, the red microphone dot would extinguish. Additionally or alternatively, an indicator that indicates that the microphone 116 is open and/or the degree of decay of the processing level 222 for speech recognition may be a hardware indicator, such as a light on the device 110 (e.g., a light emitting diode (LED)). For instance, an LED fades to off or blinks at a decreasing rate (e.g., more and more slowly) until extinguishing as the processing level 222 decreases until the microphone 116 is closed.

Figure 3:
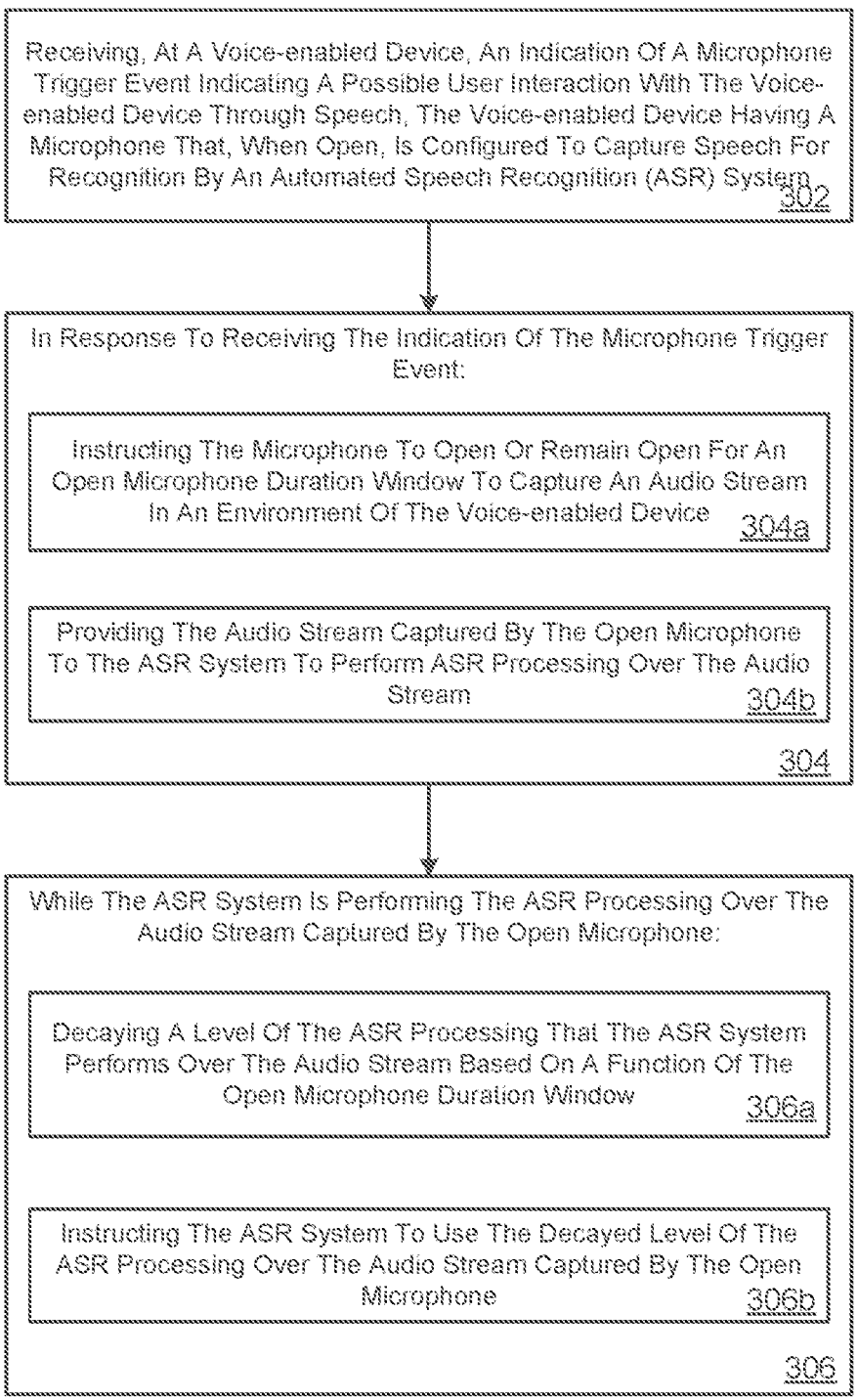
FIG. 3 is a flowchart of an example arrangement of operations for a method of decaying speech processing.

FIG. 3 is a flowchart of an example arrangement of operations for a method 300 of decaying speech processing. At operation 302, the method 300 receives, at a voice-enabled device 110, an indication of a microphone trigger event 202 indicating a possible user interaction with the voice-enabled device 110 through speech where the voice-enabled device 110 has a microphone 116 that, when open, is configured to capture speech for recognition by an automated speech recognition (ASR) system 150. Operation 304 includes two sub-operations 304, 304a-b that occur in response to receiving the indication of the microphone trigger event 202. At operations 304a, the method 300 instructs the microphone 116 to open or remain open for an open microphone duration window 212 to capture an audio stream 16 in an environment 100 of the voice-enabled device 110. At operation 304b, the method 300 provides the audio stream 16 captured by the open microphone 116 to the ASR system 150 to perform ASR processing over the audio stream 16. Operation 306 includes two sub-operations 306, 306a-b that occur while the ASR system 150 is performing the ASR processing over the audio stream 16 captured by the open microphone 116. At operation 306, the method 300 decays a level 222 of the ASR processing that the ASR system 150 performs over the audio stream 16 based on a function of the open microphone duration window 212. At operation 306b, the method 300 instructs the ASR system 150 to use the decayed level 204, 222 of the ASR processing over the audio stream 16 captured by the open microphone 116.

Figure 4:
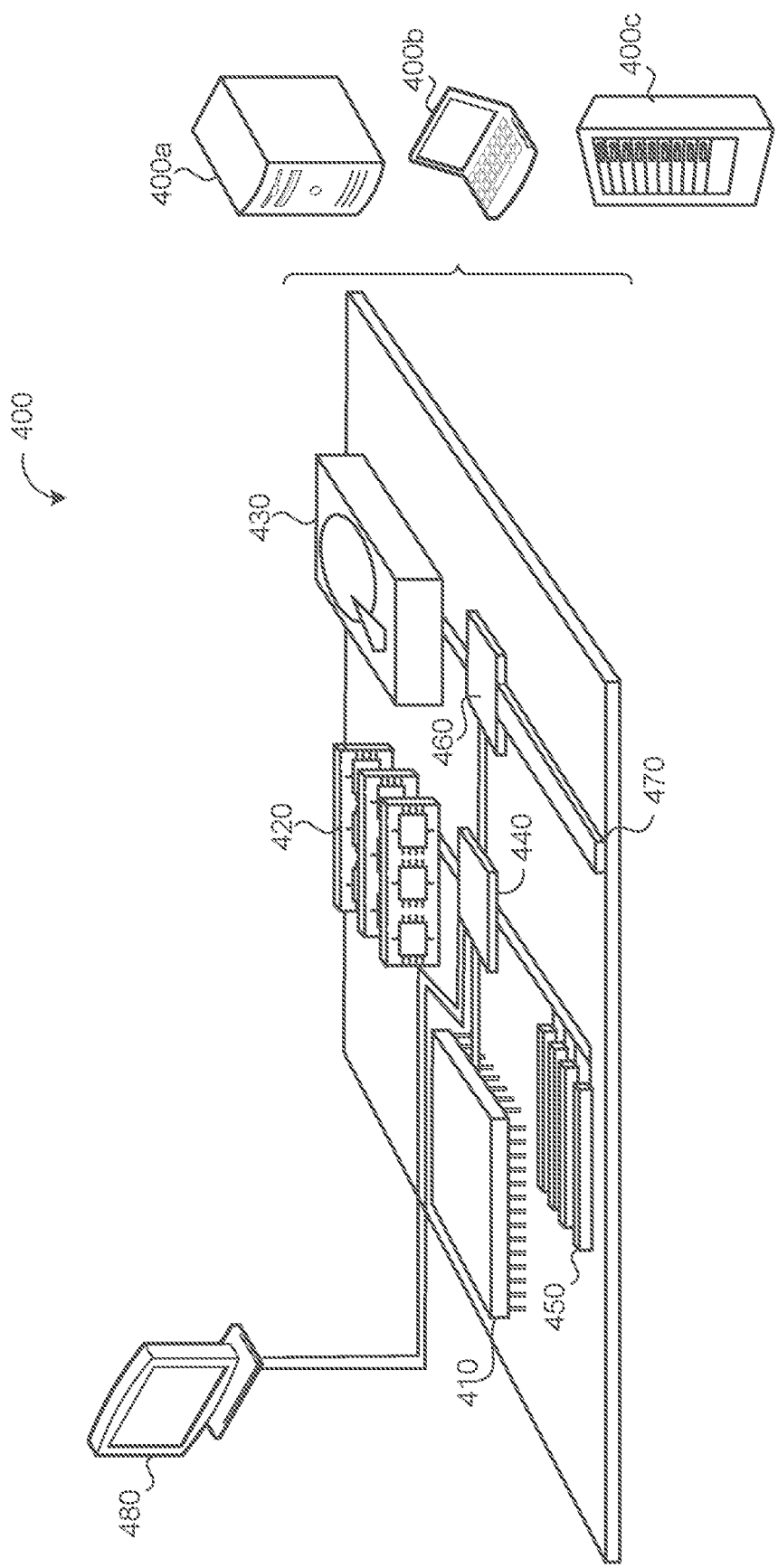
FIG. 4 is a schematic view of an example computing device that may be used to implement the systems and methods described herein.

FIG. 4 is a schematic view of an example computing device 400 that may be used to implement the systems (e.g., the device 110, the interface 120, the remote system 140, the speech recognition system 150, the search engine 160, and/or the analyst 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e g, program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM. EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims

What is claimed is:
1. A method comprising:
receiving, at data processing hardware of a voice-enabled device, an indication of a microphone trigger event indicating a possible user interaction with the voice-enabled device through speech, the voice-enabled device having a microphone that, when open, is configured to capture speech for recognition by an automated speech recognition (ASR) system;
in response to receiving the indication of the microphone trigger event:
instructing, by the data processing hardware, the microphone to open or remain open for an open microphone duration window to capture an audio stream in an environment of the voice-enabled device; and
providing, by the data processing hardware, the audio stream captured by the open microphone to the ASR system to perform ASR processing over the audio stream; and
while the ASR system is performing the ASR processing over the audio stream captured by the open microphone:
decaying, by the data processing hardware, a level of ASR processing that the ASR system performs over the audio stream based on a function of the open microphone duration window, the level of ASR processing being decayed from a first level of ASR processing to a second level of ASR processing different from the first level of ASR processing, the second level of ASR processing performing speech recognition over the audio stream; and
instructing, by the data processing hardware, the ASR system to use the second level of ASR processing for performing speech recognition over the audio stream captured by the open microphone.
2. The method of claim 1, further comprising, while the ASR system is performing the ASR processing over the audio stream captured by the open microphone:
determining, by the data processing hardware, whether voice activity is detected in the audio stream captured by the open microphone,
wherein decaying the level of ASR processing the ASR system performs over the audio stream is further based on the determination of whether any voice activity is detected in the audio stream.
3. The method of claim 1, wherein:
the ASR system initially uses the first level of ASR processing to perform the ASR processing over the audio stream upon commencement of the open microphone duration window, the first level of ASR processing associated with full processing capabilities of the ASR system, and
decaying the level of ASR processing the ASR system performs over the audio stream based on the function of the open microphone duration window comprises:
determining whether a first interval of time has elapsed since commencing the open microphone duration window; and when the first interval of time has elapsed, decaying the level of ASR processing the ASR system performs over the audio stream by reducing the level of ASR processing from the first level of ASR processing to the second level of ASR processing, the second level of ASR processing less than the first level of ASR processing.

4. The method of claim 1, wherein instructing the ASR system to use the second level of ASR processing comprises instructing the ASR system to switch from performing the ASR processing on a remote server in communication with the voice-enabled device to performing the ASR processing on the data processing hardware of the voice-enabled device.

5. The method of claim 1, wherein instructing the ASR system to use the second level of ASR processing comprises instructing the ASR system to switch from using a first ASR model to a second ASR model for performing the ASR processing over the audio stream, the second ASR model comprising fewer parameters than the first ASR model.

6. The method of claim 1, wherein instructing the ASR system to use the second level of ASR processing comprises instructing the ASR system to reduce a number of ASR processing steps performed over the audio stream.

7. The method of claim 1, wherein instructing the ASR system to use the second level of ASR processing comprises instructing the ASR system to adjust beam search parameters to reduce a decoding search space of the ASR system.

8. The method of claim 1, wherein instructing the ASR system to use the second level of ASR processing comprises instructing the ASR system to perform quantization and/or sparsification on one or more parameters of the ASR system.

9. The method of claim 1, further comprising:
obtaining, by the data processing hardware, a current context when the indication of the microphone trigger event is received,
wherein instructing the ASR system to use the second level of ASR processing comprises instructing the ASR system to bias speech recognition results based on the current context.

10. The method of claim 1, wherein instructing the ASR system to use the second level of ASR processing comprises instructing the ASR system to switch from system on a chip-based (SOC-based) processing to perform the ASR processing on the audio stream to digital signal processor-based (DSP-based) processing to perform the ASR processing on the audio stream.

11. The method of claim 1, wherein, while the ASR system is using the second level of ASR processing over the audio stream captured by the open microphone, the ASR system is configured to:
generate a speech recognition result for audio data corresponding to a query spoken by a user; and
provide the speech recognition result to an application to perform an action specified by the query.

12. The method of claim 1, further comprising, after instructing the ASR system to use the second level of the ASR processing over the audio stream:
receiving, at the data processing hardware, an indication that a confidence for a speech recognition result for a voice query that is output by the ASR system fails to satisfy a confidence threshold; and
instructing, by the data processing hardware, the ASR system to:
increase the level of ASR processing from the second level of ASR processing to a third level of ASR processing; and
reprocess the voice query using the third level of ASR processing.

13. The method of claim 1, further comprising, while the ASR system is performing the ASR processing over the audio stream captured by the open microphone:
decaying, by the data processing hardware, the level of ASR processing from the second level of ASR processing to a third level of ASR processing;
determining, by the data processing hardware, when the third level of ASR processing the ASR system performs over the audio stream based on the function of the open microphone duration window is equal to zero; and
when the third level of ASR processing the ASR system performs is equal to zero, instructing, by the data processing hardware, the microphone to close.

14. The method of claim 1, further comprising displaying, by the data processing hardware, in a graphical user interface of the voice-enabled device, a graphical indicator indicating the second level of ASR processing is being performed by the ASR system on the audio stream.

15. A system comprising:
data processing hardware; and
memory hardware in communication with the data processing hardware, the memory hardware storing instructions that when executed on the data processing hardware, cause the data processing hardware to perform operations comprising:
receiving, at a voice-enabled device, an indication of a microphone trigger event indicating a possible user interaction with the voice-enabled device through speech, the voice-enabled device having a microphone that, when open, is configured to capture speech for recognition by an automated speech recognition (ASR) system;
in response to receiving the indication of the microphone trigger event:
instructing the microphone to open or remain open for an open microphone duration window to capture an audio stream in an environment of the voice-enabled device; and
providing the audio stream captured by the open microphone to the ASR system to perform ASR processing over the audio stream; and
while the ASR system is performing the ASR processing over the audio stream captured by the open microphone:
decaying, by the data processing hardware, a level of ASR processing that the ASR system performs over the audio stream based on a function of the open microphone duration window, the level of ASR processing being decayed from a first level of ASR processing to a second level of ASR processing different from the first level of ASR processing, the second level of ASR processing performing speech recognition over the audio stream; and
instructing, by the data processing hardware, the ASR system to use the second level of ASR processing for performing speech recognition over the audio stream captured by the open microphone.

16. The system of claim 15, wherein the operations further comprise, while the ASR system is performing the ASR processing over the audio stream captured by the open microphone:
determining whether voice activity is detected in the audio stream captured by the open microphone, wherein decaying the level of ASR processing the ASR system performs over the audio stream is further based on the determination of whether any voice activity is detected in the audio stream.

17. The system of claim 15, wherein:
the ASR system initially uses the first level of ASR processing to perform the ASR processing over the audio stream upon commencement of the open microphone duration window, the first level of ASR processing associated with full processing capabilities of the ASR system, and
decaying the level of ASR processing the ASR system performs over the audio stream based on the function of the open microphone duration window comprises:
determining whether a first interval of time has elapsed since commencing the open microphone duration window; and
when the first interval of time has elapsed, decaying the level of ASR processing the ASR system performs over the audio stream by reducing the level of ASR processing from the first level of ASR processing to the second level of ASR processing, the second level of ASR processing less than the first level of ASR processing.

18. The system of claim 15, wherein instructing the ASR system to use the second level of ASR processing comprises instructing the ASR system to switch from performing the ASR processing on a remote server in communication with the voice-enabled device to performing the ASR processing on the data processing hardware of the voice-enabled device.

19. The system of claim 15, wherein instructing the ASR system to use the second level of ASR processing comprises instructing the ASR system to switch from using a first ASR model to a second ASR model for performing the ASR processing over the audio stream, the second ASR model comprising fewer parameters than the first ASR model.

20. The system of claim 15, wherein instructing the ASR system to use the second level of ASR processing comprises instructing the ASR system to reduce a number of ASR processing steps performed over the audio stream.

21. The system of claim 15, wherein instructing the ASR system to use the second level of ASR processing comprises instructing the ASR system to adjust beam search parameters to reduce a decoding search space of the ASR system.

22. The system of claim 15, wherein instructing the ASR system to use the second level of ASR processing comprises instructing the ASR system to perform quantization and/or sparsification on one or more parameters of the ASR system.

23. The system of claim 15, wherein the operations further comprise:
obtaining a current context when the indication of the microphone trigger event is received,
wherein instructing the ASR system to use the second level of ASR processing comprises instructing the ASR system to bias speech recognition results based on the current context.

24. The system of claim 15, wherein instructing the ASR system to use the second level of ASR processing comprises instructing the ASR system to switch from system on a chip-based (SOC-based) processing to perform the ASR processing on the audio stream to digital signal processor-based (DSP-based) processing to perform the ASR processing on the audio stream.

25. The system of claim 15, wherein, while the ASR system is using the second level of ASR processing over the audio stream captured by the open microphone, the ASR system is configured to:
generate a speech recognition result for audio data corresponding to a query spoken by a user; and
provide the speech recognition result to an application to perform an action specified by the query.

26. The system of claim 15, wherein the operations further comprise, after instructing the ASR system to use the second level of ASR processing over the audio stream:
receiving, at the data processing hardware, an indication that a confidence for a speech recognition result for a voice query that is output by the ASR system fails to satisfy a confidence threshold; and
instructing, by the data processing hardware, the ASR system to:
increase the level of ASR processing from the second level of ASR processing to a third level of ASR processing; and
reprocess the voice query using the third level of ASR processing.

27. The system of claim 15, wherein the operations further comprise, while the ASR system is performing the ASR processing over the audio stream captured by the open microphone:
decaying, by the data processing hardware, the level of ASR processing from the second level of ASR processing to a third level of ASR processing;
determining, by the data processing hardware, when the third level of ASR processing the ASR system performs over the audio stream based on the function of the open microphone duration window is equal to zero; and
when the third level of ASR processing the ASR system performs is equal to zero, instructing, by the data processing hardware, the microphone to close.

28. The system of claim 15, wherein the operations further comprise displaying, by the data processing hardware, in a graphical user interface of the voice-enabled device, a graphical indicator indicating the second level of ASR processing is being performed by the ASR system on the audio stream.

* * * * *